May 21, 1968 R. F. GILCHRIST 3,384,392

LOCK COUPLING FOR PIPE

Filed Feb. 15, 1965 3 Sheets-Sheet 1

INVENTOR
ROBERT FOWLER GILCHRIST
BY Semmes & Semmes
ATTORNEYS

May 21, 1968  R. F. GILCHRIST  3,384,392
LOCK COUPLING FOR PIPE
Filed Feb. 15, 1965  3 Sheets-Sheet 2

INVENTOR
ROBERT FOWLER GILCHRIST

BY Semmes & Semmes
ATTORNEYS

May 21, 1968  R. F. GILCHRIST  3,384,392
LOCK COUPLING FOR PIPE

Filed Feb. 15, 1965  3 Sheets-Sheet 3

INVENTOR
ROBERT FOWLER GILCHRIST

BY Semmes & Semmes
ATTORNEYS

United States Patent Office 3,384,392
Patented May 21, 1968

3,384,392
LOCK COUPLING FOR PIPE
Robert Fowler Gilchrist, Wichita Falls, Tex., assignor to Vega Manufacturing Corporation, Wichita Falls, Tex., a corporation of Texas
Continuation-in-part of application Ser. No. 415,987, Dec. 4, 1964. This application Feb. 15, 1965, Ser. No. 432,467
6 Claims. (Cl. 285—105)

This application is a continuation-in-part of application Ser. No. 415,987, filed Dec. 4, 1964, and entitled, Coupling for Plastic Pipe, and now abandoned.

The present application relates to a lock coupling for plain end pipe, particularly a readily assembled coupling wherein abutting pipe ends are locked in end to end relationship without the necessity of having threaded, grooved or any type of special pipe ends.

The present lock coupling is designed for use with steel pipe, cast iron pipe, aluminum and plastic lines where the lines are to be laid on the top of the ground and not buried. There are many couplings on the market today for steel pipe such as threaded collars, and the more recent Vic-taulic type couplings which require especially grooved pipe ends. According to the present invention a lock coupling is provided which does not require any special treatment of the pipe ends. Neither grooves nor threads are required in the pipe ends, because the present lock coupling embodies toothed lugs radially supported within the gasket and extending radially inwardly thereof to lock the pipe into place within the coupling. Furthermore, the present lock coupling also embodies a quick-release feature, enabling ready removal of the pipe ends from the lock coupling.

Applicant, accordingly, has developed a fluid tight lock coupling for any type pipe ends which locks the pipe against longitudinal movement outwardly of the gasket. Also, applicant's coupling enables vari-angular support of the abutting pipe ends within the coupling without breaking of the fluid-tight seal. These accomplishments are the result of employment of especial locking seals within a uniquely configured rigid plastic coupling.

Accordingly, it is an object of invention to provide a lock coupling for pipe which can lock together any type of abutting pipe ends, while eliminating the necessity for special treatment of the pipe ends.

Another object of invention is to provide a coupling for pipe permitting vari-angular support of the pipe ends without breaking of the fluid tight seal.

Yet, additional objects of invention will become apparent from the ensuing specification and attached drawings wherein:

FIG. 1 is a perspective view of the proposed gasket;
FIG. 2 is a rear elevation of the gasket showing tapered bore 14;
FIG. 3 is a front elevation of the gasket showing the radially, inwardly extending lock teeth 60;
FIG. 4 is a side elevation;
FIG. 5 is a side elevation, partially in section of a coupling, showing abutting pipe ends supported in end to end relationship, pipe end 50 being inserted inwardly in the direction of the arrow, pipe 52 being partially withdrawn in the direction of the arrow to compress the gasket and lock toothed lugs 54 into the pipe.

Figure 1:
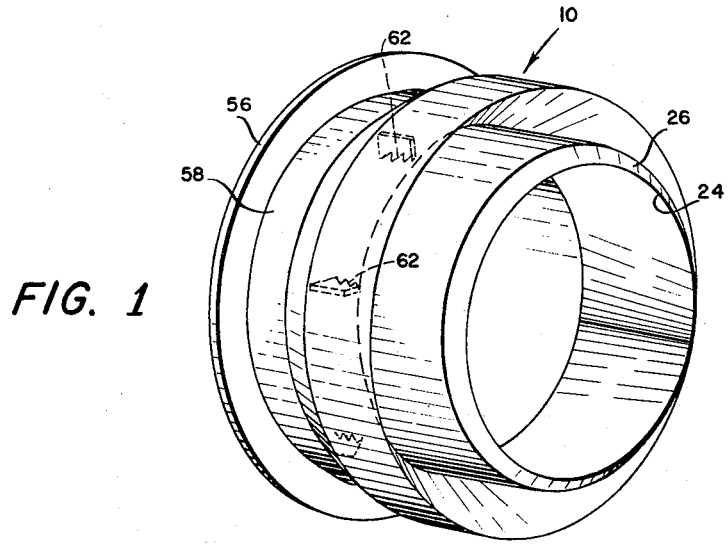
Figure 2:
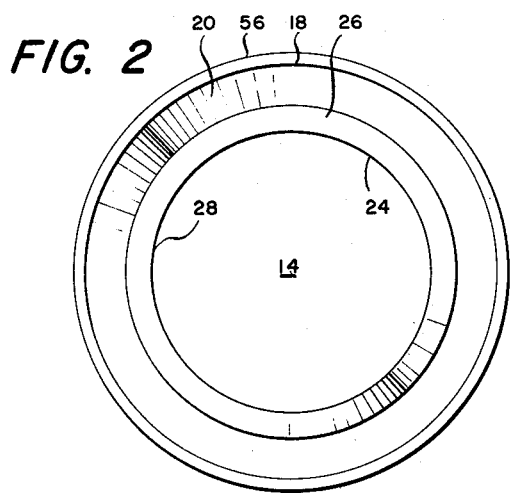

In FIG. 1, proposed gasket 10 is illustrated as comprising radially, outwardly extending back rim 56 and an adjacent elongated portion 58. A parallelogram-shaped portion 12 extends rearwardly of elongated portion 58, and has inset therein radially, inwardly extending lugs 60 having rearwardly inclined teeth 62. Bore 14 is increasingly tapered toward its forward end innersealing lip 24. Back rim 56 is provided with an inwardly converging flange 16 which connects with the inwardly tapered walls 28 terminating in flange 26 and feather edge 24, having a reduced diameter. Outer wedge-shaped sealing lip 18 includes rear shoulder 19 and is defined by inset cut 20 which permits diverging of outer sealing lip 18 under radial compressive forces. Pre-tensioned portion 22 includes convergent flange 26 which extends to reduced diameter feather edge 24. The entire lip 22 is "pre-tensioned" in that the bore 14 is made of lesser diameter than the pipe ends 50 and 52 which are to be inserted therein.

Coupling 30 may be metal pre-cast or molded of rigid plastic material, reinforced by radially inwardly extending shoulders 64 and 66 which serve also as a sealing base for gasket shoulders 19. Shoulders 64 and 66 have a lesser inner diameter than the diameter of opposed teeth 62. Radially inwardly extending teeth 62 thus inwardly abut shoulders 64 and 66 which hold lug 60 and gasket 10 from being withdrawn from coupling 30. Coupling 30 may be bagged and shipped separately from the pipe sections. An optional inner coupling divider flange 68 may be employed to define a reduced diameter portion. Thus, pipe ends 50 and 52 may be shoved in coupling 30 until they strike flange 68, then partially withdrawn until teeth 62 lock into the pipe surface, as illustrated in the right-hand side of FIG. 5.

Figure 5:
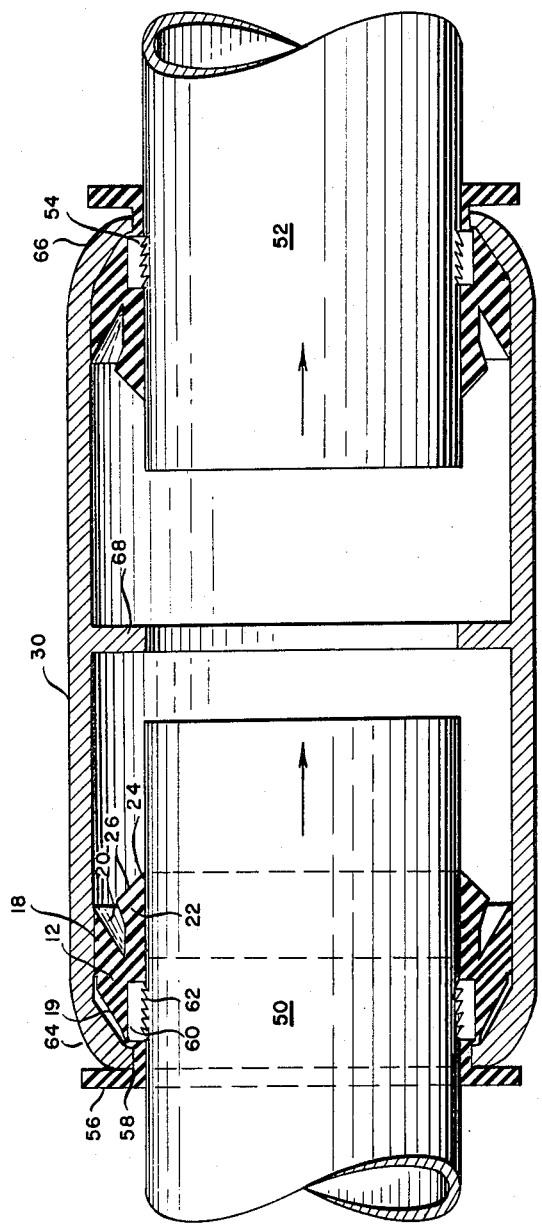

As illustrated in FIG. 5, pipe ends 50 and 52 may be inserted on the job through gasket bore 14 in end to end relationship, the extent of their insertion being limited by flange 68. Inasmuch as reduced diameter bore 14 is pre-tensioned in the area of feather edge 24, the pushing of the pipe through feather edge 24 urges outer sealing lip 18 outwardly into radial compressive sealing position against the inner walls of the coupling. Similarly, lip 22 is "set up" in sealing relationship with the pipe end. This effects the fluid tight seal both about the pipe ends and between the pipe ends and the inner walls of coupling 30.

Figure 3:
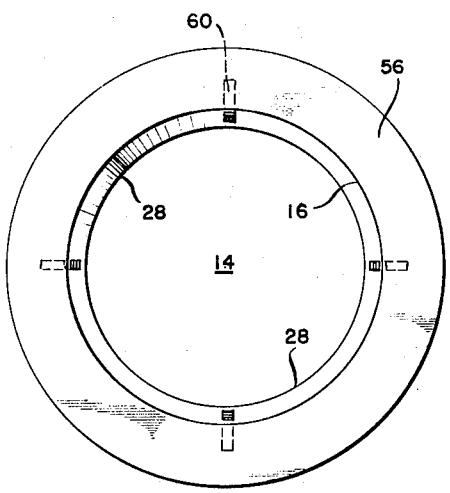
Figure 4:
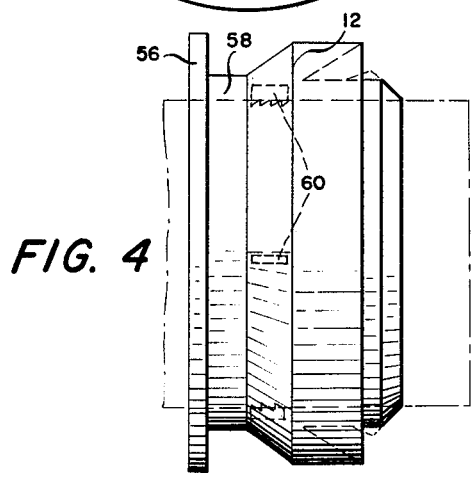

Inasmuch as inner sealing lip 22 is longitudinally and inwardly off-set with respect to outer sealing lip 18, pipes 50 and 52 might be supported in vari-angular position without upsetting the fluid tight seal of lip 18 against the coupling inner walls or the abutment of shoulder 19 against coupling ends 64 and 66. Also, the longitudinal space between joint divider piece and the feather edge 24 permits a free area for longitudinal movement of the pipe ends 50 and 52 until locked into cast iron or steel teeth 62. This locking characteristic is vital and prevents breaking of the seal upon contraction of the pipe sections due to temperature changes. Although four teeth 62 are illustrated in FIG. 3, a greater or lesser number of teeth may be employed, depending upon the character of pipe sections being sealed, as well as pressure conditions. Inasmuch as bore 14 at feather edge 24 is pre-tensioned at a reduced diameter, a single coupling may provide for the abutment of pipe ends of varying diameter. For example, at one end pipe 50 might be 4.75 inches in outer diameter, whereas the outer diameter of pipe 52 might be 5.25 inches in outer diameter. This characteristic is especially beneficial in coupling of new plastic pipes to older lines which frequently have been laid in sizes not corresponding to present outer diameters. The radially in-set relationship of lip 24 with respect to lip 18 provides for a measure of misalignment in the laid pipe without upsetting the seal. Lip 24 is permitted to play vertically without disturbing lip 18 and without upsetting the fluid tight seal. Manifestly, almost any type of iron pipe or plastic pipe, including the various synthetic rubber products, may be coupled so together.

Since couplings 30 are not required to be inserted on the pipe ends until the pipe is laid, lengths of plastic pipe as well as other types of pipe may be stored one upon the other and shipped without distortion. Also, since coupling 30 is pre-molded and reinforced it actually protects the installed pipe from distortion due to environmental pressure.

The present coupling 30 also provides for ready withdrawal of pipes 50 and 52. In FIG. 5 pipe 52 is indicated as having teeth 54 locked into the exterior of the type of the pipe while the outer grommet ring 56 has been withdrawn from shoulder 66 approximately ⅛ inch. In order to release the lock coupling and remove the pipe 52, the pressure inside the pipe is first reduced to zero. Pipe end 52 is then pushed inwardly towards flange 68, thus moving the toothed lugs 60 into the coupling and away from the compressive forces exerted by shoulders 66. Pipe 52 may then be slid inwardly away from teeth 60. Consequently, by holding a hand pressure against grommet 56 the toothed lugs 60 are kept from wedging between the pipe and the swedged down shoulder 64, and the pipe may be readily withdrawn outwardly. On the other hand, by releasing pressure from grommet edge 56, the gasket 10 is urged outwardly with the pipe being withdrawn until lugged teeth 54 swedge up against shoulders 66 and are radially inwardly compressed so that the teeth bite into and hold the pipe against withdrawal.

Figure 6:
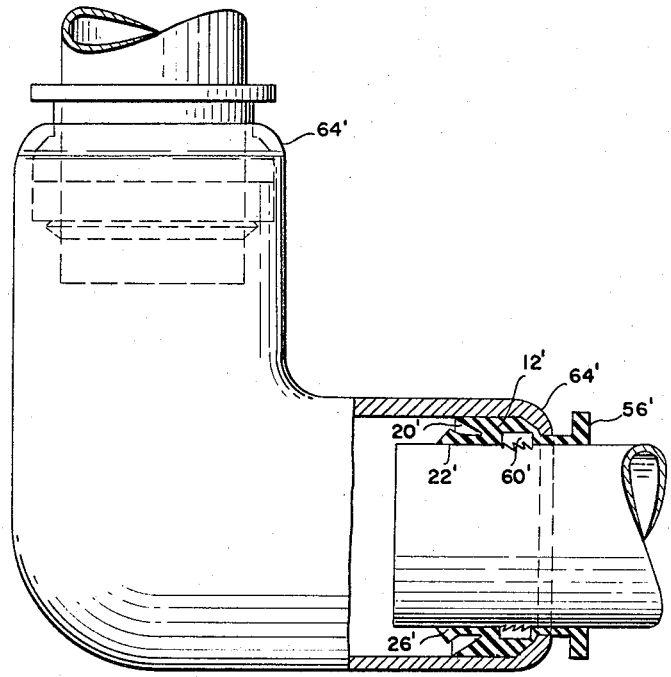
FIG. 6 is a side elevation; partially in section, showing an L-type lock coupling similar to that illustrated in FIG. 5.
Figure 7:
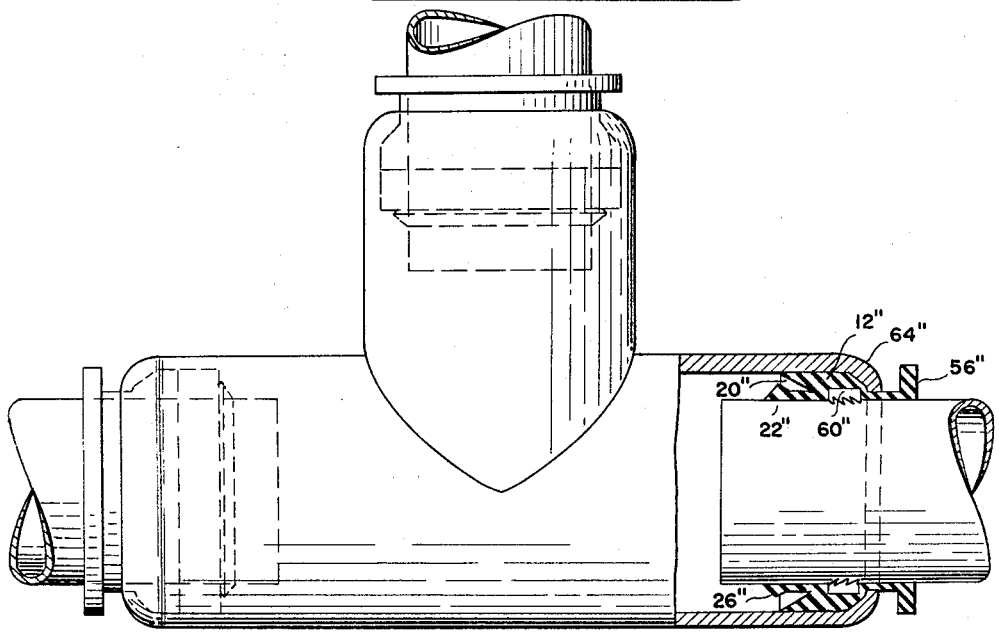
FIG. 7 is a side elevation; partially in section, showing a T-type lock coupling similar to that illustrated in FIG. 5.

As will be apparent, this coupling can be used with almost any type of pipe and is not limited to the coupling of dual opposed pipe ends. Rather, it may be employed in a T or L connection with equal convenience, as illustrated in FIGS. 6 and 7.

Manifestly, various minor alterations in gasket and coupling structure may be employed without departing from the spirit and scope of invention, as defined in the subjoined claims.

I claim:
1. A fluid-seal pipe coupling assembly of the type engaging two or more pipe ends in fluid seal relationship, comprising in combination:
   (A) an outer coupling, having inwardly tapered shoulders at either end;
   (B) two or more inner pipe members communicably supported within said coupling, said pipe members and coupling defining an annular space between them communicating with pressure fluid flowing through said pipe members; and
   (C) a pressure-fluid sealing gasket for the annular space between an inner pipe member and an outer coupling member to seal the joint space while the forward end of the gasket is exposed to fluid pressure and the back end is urged against a supporting surface in the coupling, said gasket being of the type having an axially elongated body defining a bore increasingly tapered from its back to its front end and including:
      (i) a radially, outwardly extending back rim adapted to abut the exterior ends of a pipe coupling;
      (ii) an intermediate elongated portion extending forwardly from said back rim and of sufficient length to permit longitudinal play of said gasket within said coupling;
      (iii) a middle circumferential face extending radially outwardly from the forward end of said elongated portion and adapted to engage a corresponding radially inwardly extending shoulder surface in a pipe coupling upon outward longitudinal play of said gasket within said coupling;
      (iv) at least one toothed, lug radially inset within said middle circumferential face with teeth extending rearwardly into said bore so as to grip a pipe supported therein;
      (v) an outer wedge-shaped sealing lip adjacent to said middle circumferential face and adapted to engage the inner surface of a pipe coupling; and
      (vi) an inner sealing lip presented forwardly of said wedge-shaped sealing lip and defined at its front rim by a radially converging feather lip, said inner sealing lip being pre-tensioned to a diameter smaller than the diameter of pipe to be supported in said gasket.

2. A fluid sealing pipe coupling as in claim 1, the teeth in said lug being inclined rearwardly so as to lock into said pipe upon partial withdrawal of said pipe from said gasket.

3. A fluid-seal pipe coupling as in claim 2, said coupling including:
   (i) a joint divider piece defining a bore of lesser diameter than the diameter of the pipe ends, the distance between said joint divider piece and said inner sealing lip defining an area of longitudinal fluid-seal withdrawal of said pipe within said coupling.

4. A fluid-seal pipe coupling as in claim 3, said pressure-fluid sealing gasket being movable inwardly away from said inwardly tapered shoulders so as to release said toothed lug from radially compressive engagement with said pipe for withdrawal of said pipe from said sealing gasket.

5. A pressure-fluid sealing gasket for the annular space between an inner pipe member and an outer coupling member to seal the joint space while the forward end of the gasket is exposed to fluid pressure and the back end is urged against a supporting surface in the coupling, said gasket being of the type having an axially elongated body defining a bore increasingly tapered from its back to its front end and including:
   (A) a radially, outwardly extending back rim adapted to abut the exterior ends of a pipe coupling;
   (B) an intermediate elongated portion extending forwardly from said back rim and of sufficient length to permit longitudinal play of said gasket within said coupling;
   (C) a middle circumferential face extending radially outwardly from the forward end of said elongated portion and adapted to engage a corresponding radially inwardly extending shoulder surface in a pipe coupling upon outward longitudinal play of said gasket within said coupling;
   (D) at least one toothed, lug radially inset within said middle circumferential face portion with teeth extending rearwardly into said bore so as to grip a pipe supported therein;
   (E) an outer wedge-shaped sealing lip adjacent to said middle circumferential face and adapted to engage the inner surface of a pipe coupling; and (F) an inner sealing lip presented forwardly of said wedge-shaped sealing lip and defined at its front rim by a radially converging feather lip, said inner sealing lip being pre-tensioned to a diameter smaller than the diameter of pipe to be supported in said gasket.

6. A pressure fluid sealing gasket as in claim 5, the teeth in said lug being inclined rearwardly so as to lock into said pipe upon partial withdrawal of said pipe from said gasket.

References Cited

UNITED STATES PATENTS

| | | | |
|---|---|---|---|
| 2,182,797 | 12/1939 | Dillon | 285—104 |
| 2,226,304 | 12/1940 | Dillon | 285—105 |
| 2,463,235 | 3/1949 | Andrews | 285—306 |
| 2,479,058 | 8/1949 | Botting | 285—104 |
| 2,508,914 | 5/1950 | Graham | 285—105 |

FOREIGN PATENTS

| | | |
|---|---|---|
| 237,391 | 12/1964 | Austria. |
| 618,723 | 3/1961 | Italy. |

EDWARD C. ALLEN, *Primary Examiner.*

CARL W. TOMLIN, *Examiner.*

R. GIANGIORI, T. F. CALLAGHAN, *Assistant Examiners.*